US012637232B1

(12) United States Patent
Wyrobek et al.

(10) Patent No.: US 12,637,232 B1
(45) Date of Patent: May 26, 2026

(54) STRUCTURES TO LIMIT COLLISION DAMAGE FOR AIRCRAFT

(71) Applicant: SCIENTIFIC APPLICATIONS AND RESEARCH ASSOCIATES, INC., Cypress, CA (US)

(72) Inventors: Keenan A. Wyrobek, Half Moon Bay, CA (US); Gavin K. Ananda Krishnan, San Carlos, CA (US); Brendan J.D. Wade, San Francisco, CA (US); Philip M. Green, Sunnyvale, CA (US); Randall R. Patterson, Littleton, CO (US)

(73) Assignee: SCIENTIFIC APPLICATIONS AND RESEARCH ASSOCIATES, INC., Cypress, CA (US)

( * ) Notice: Subject to any disclaimer, the term of this patent is extended or adjusted under 35 U.S.C. 154(b) by 0 days.

(21) Appl. No.: 19/241,105

(22) Filed: Jun. 17, 2025

Related U.S. Application Data

(63) Continuation of application No. 17/485,050, filed on Sep. 24, 2021, now Pat. No. 12,365,482.

(60) Provisional application No. 63/082,832, filed on Sep. 24, 2020.

(51) Int. Cl.
| | |
|---|---|
| B64D 45/04 | (2006.01) |
| B64D 45/00 | (2006.01) |
| B64U 20/30 | (2023.01) |

(52) U.S. Cl.
CPC ............. B64D 45/04 (2013.01); B64U 20/30 (2023.01); B64D 2045/0095 (2013.01)

(58) Field of Classification Search
CPC .......... G10K 11/004; B64D 2045/0095; B64D 43/00; H01R 13/633; B64U 20/30
See application file for complete search history.

(56) References Cited

U.S. PATENT DOCUMENTS

| | | | | | |
|---|---|---|---|---|---|
| 2,761,111 | A | * | 8/1956 | Klostermann | ....... H01R 13/633 |
| | | | | | 439/271 |
| 2,933,711 | A | * | 4/1960 | Eaton | ................... H01R 13/633 |
| | | | | | 439/316 |
| 4,428,549 | A | * | 1/1984 | Halliday | ................ B64D 39/04 |
| | | | | | 73/182 |
| 5,306,156 | A | * | 4/1994 | Gibbs | .................. H01R 13/639 |
| | | | | | 224/315 |
| 5,352,090 | A | * | 10/1994 | Churchill | .............. B64C 27/008 |
| | | | | | 416/34 |

(Continued)

FOREIGN PATENT DOCUMENTS

| | | | | | |
|---|---|---|---|---|---|
| CN | | 204802096 U | * | 11/2015 | |
| CN | | 111308113 A | * | 6/2020 | ................ G01P 1/00 |

*Primary Examiner* — Joshua J Michener
*Assistant Examiner* — Michael B. Kreiner
(74) *Attorney, Agent, or Firm* — STETINA GARRED BRUCKER & NEWBOLES

(57) ABSTRACT

Described herein is an aircraft. The aircraft includes a peripheral assembly, such as a sensor probe. The aircraft further includes a release assembly connecting the peripheral assembly to a portion of the aircraft. The release assembly is configured to separate the peripheral assembly and the portion upon receipt of a threshold force. The release assembly may be configured to allow for the quick release, such as via a snap-fit connection, between the peripheral assembly and the portion of the aircraft.

18 Claims, 14 Drawing Sheets

(56)    References Cited

U.S. PATENT DOCUMENTS

| | | | | |
|---|---|---|---|---|
| 6,745,981 | B1 * | 6/2004 | Rainer | B64D 7/00 |
| | | | | 343/705 |
| 7,520,467 | B2 * | 4/2009 | Gioffre | B64D 47/08 |
| | | | | 343/872 |
| 8,500,067 | B2 * | 8/2013 | Woodworth | B64U 50/19 |
| | | | | 244/140 |
| 10,513,348 | B2 * | 12/2019 | Tabuteau | H01Q 3/06 |
| 10,807,710 | B2 * | 10/2020 | Tian | B64U 20/80 |
| 10,894,593 | B2 * | 1/2021 | Benson | B64U 50/13 |
| 11,613,185 | B1 * | 3/2023 | Wiegman | B60L 53/16 |
| | | | | 320/109 |
| 11,765,494 | B2 * | 9/2023 | Wyrobek | H04R 1/026 |
| | | | | 381/86 |
| 2019/0185178 | A1 * | 6/2019 | Zhou | G01C 23/005 |
| 2021/0405662 | A1 * | 12/2021 | Asai | G05D 1/46 |

* cited by examiner

STRUCTURES TO LIMIT COLLISION DAMAGE FOR AIRCRAFT

CROSS-REFERENCE TO RELATED APPLICATIONS

This continuation application claims priority to U.S. patent application Ser. No. 17/485,050, entitled "STRUCTURES TO LIMIT COLLISION DAMAGE FOR AIRCRAFT," filed on Sep. 24, 2021, and claims priority to and the benefit of U.S. Provisional Patent Application No. 63/082,832 filed Sep. 24, 2020, entitled "STRUCTURES TO LIMIT COLLISION DAMAGE FOR AIRCRAFT," the entire disclosure of which is incorporated herein in its entirety by reference for all purposes.

FIELD

The described embodiments relate generally to aircraft, and more particularly, to structures and systems that limit collision damage to the aircraft.

BACKGROUND

Aircraft, such as unmanned aerial vehicles (UAVs), may be used to efficiently deliver payloads, such as products, items, and the like, to various locations and/or to consumers. A variety of components and systems may facilitate the operation of the aircraft, including ·various sensors, aerodynamic components, propulsion systems, landing systems, and so on. These components may be integrated with the aircraft itself and, in some cases, protrude or extend from a surface of the aircraft. In conventional systems, a localized collision with one or more components (e.g., a sensor) during flight or other operations may contribute to catastrophic failure of the entire aircraft. For example, a collision or damage to a sensor or system component mounted on a wing of the aircraft likely would result in total damage of the entire wing and possibly other areas of the aircraft. Accordingly, such components may hinder the operation of the aircraft, may require substantial resources to repair after damage, and may be design-constrained by collision avoidance considerations instead of optimizing the component operation itself.

SUMMARY

In one example, an aircraft is disclosed. The aircraft includes a peripheral assembly. The aircraft further includes a breakaway mechanism connecting the peripheral assembly to a portion of the aircraft. The breakaway mechanism is configured to separate the peripheral assembly and the portion upon receipt of a threshold force.

In another example, an aircraft is disclosed. The aircraft includes a wing assembly. The aircraft further includes a peripheral assembly releasably connected to the wing assembly. The wing assembly and the peripheral assembly cooperate to selectively release the peripheral assembly from the wing assembly while the wing assembly remains substantially intact within the aircraft.

In another example, a method is disclosed. The method includes receiving a threshold force along a peripheral assembly of an aircraft. The method further includes releasing the peripheral assembly from a portion of the aircraft. The portion remains substantially intact during the releasing of the peripheral assembly.

In another example, an aircraft is disclosed. The aircraft includes a peripheral assembly. The aircraft includes a release assembly connecting the peripheral assembly to a portion of the aircraft. The release assembly is configured to separate the peripheral assembly and the portion upon receipt of a threshold force.

In another example, the portion includes at least one of a wing assembly or a fuselage. The peripheral assembly may include a sensor probe. The sensor probe may include a microphone assembly having a portion configured to receive audio signals. The sensor probe may include a nosecone configured to shield the portion of the microphone assembly from noise generated by direct impact of airflow.

In another example, the release assembly includes a connecting feature that releasably connects the sensor probe to the portion of the aircraft. The connecting feature may be configured to release the sensor probe from the portion of the aircraft upon receipt the threshold force. The connecting feature may be configured to deform upon the release assembly receiving the threshold force, permitting separation of the sensor probe from the portion of the aircraft.

In another example, the connecting feature may include at least one flexible prong. Further, the connecting feature may include a plurality of flexible prongs that cooperate to define a multi-point releasable connection between the sensor probe and the portion of the aircraft. The at least one flexible prongs may include a flex portion and an overhang portion arranged at an end of the flex portion. In this regard, the overhang may be configured to be seated in a catch feature of the portion of the aircraft. The overhang may impede exit of the connecting feature from the portion absent deformation of the flex portion.

In another example, the release assembly may include a blade connected to the sensor probe. The release assembly may further include a mounting plate connected to the blade. The connecting feature may include a plurality of flexible prongs that protrude from the mounting plate to define a multi-point releasable connection between the sensor probe and the portion of the aircraft.

In another example, an aircraft is disclosed. The aircraft includes a wing assembly. The aircraft includes a peripheral assembly releasably connected to the wing assembly. The wing assembly and the peripheral assembly cooperate to selectively release the peripheral assembly from the wing assembly while the wing assembly remains substantially intact within the aircraft.

In another example, the aircraft further includes a release assembly connecting the wing assembly and the peripheral assembly and configured to separate the peripheral assembly and the wing assembly upon receipt of a threshold force. The release assembly may include at least one flexible component extending be from the peripheral assembly and into the wing assembly, the at least one flexible component is configured to deform upon the receipt of the threshold force and release the peripheral assembly from the release assembly.

In another example, the at least one flexible component defines a snap-fit connection between the peripheral assembly and the wing assembly. The release assembly may be configured to maintain a connection between the wing assembly and the peripheral assembly such that an electrical connection is maintained between the peripheral assembly and the wing assembly. Further, the at least one flexible component may be configured to deform upon receipt of the threshold force such that the peripheral assembly and the wing assembly and electrically uncoupled from one another.

In another example, a method is disclosed. The method includes connecting a peripheral assembly to a portion of an aircraft by defining a snap-fit connection between a connecting feature of the peripheral assembly and a catch of the portion of the aircraft. The method further includes, releasing the peripheral assembly from a portion of the aircraft by elastically deforming the connecting feature. The portion remains substantially intact during the releasing of the peripheral assembly.

In another example, the connecting feature include a plurality of flexible prongs. Further, the peripheral assembly may include a first peripheral assembly. Accordingly, the method may further include, after the releasing, connecting a second peripheral assembly to the portion of the aircraft by defining a snap-fit connection between a second connecting feature of the second peripheral assembly and the catch of the portion of the aircraft.

In addition to the exemplary aspects and embodiments described above, further aspects and embodiments will become apparent by reference to the drawings and by study of the following description.

DETAILED DESCRIPTION

Figure 1A:
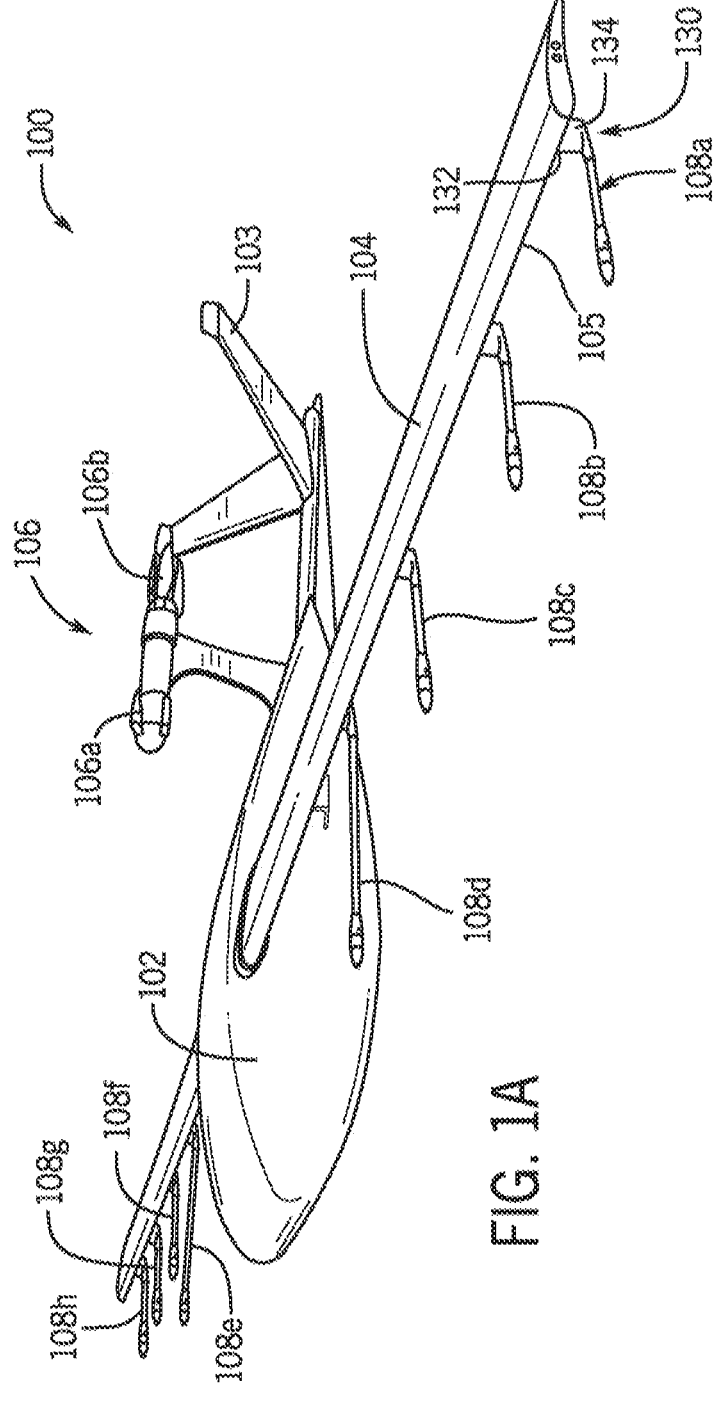
FIG. 1A depicts an isometric view of an aircraft having one or more peripheral assemblies.

The description that follows includes sample systems, methods, and apparatuses that embody various elements of the present disclosure. However, it should be understood that the described disclosure may be practiced in a variety of forms in addition to those described herein.

The following disclosure describes systems and techniques to facilitate a clean separation or breakaway of a peripheral assembly from an aircraft. A sample aircraft may include an unmanned aerial vehicle (UA V). The systems and techniques described herein are also applicable to piloted aerials vehicles and/or other vehicles or moving objects more generally. A sample peripheral assembly may include a sensor probe, which may be a generally elongated structure having one or more sensors that detect signals to facilitate the operation of the aircraft. Peripheral assemblies may also include other components and subassemblies, such as various aerodynamic components (e.g., winglets), propulsion systems (e.g., blades), and/or substantially any other component of the aircraft. Often peripheral assemblies may be positioned on the exterior of the aircraft and even extrude or protrude from the aircraft, and therefore be subject to collision with environmental objects, including other aircraft, ground structures, vegetation, birds, and so on, for example. A sensor probe, as an illustration, may extend elongated from an underside of a wing of the aircraft and be subject to impact with objects of an external environment. Where peripheral assemblies are rigidly fixed to the aircraft, any collision with the assembly may subject the aircraft to catastrophic failure or at the least very time and resource expensive repairs.

The present disclosure allows peripheral assemblies to separate, release, or break away from a portion of the aircraft upon impact, helping to mitigate damage and issues that can occur with a collision as well as allowing quick and easy replacement of components. The peripheral assembly may break away from the portion of the aircraft while the portion of the aircraft, such as the wing assembly, remains intact with the aircraft. Accordingly, the aircraft may continue operation upon the impact and break away of the peripheral assembly, allowing the aircraft to land in a controlled manner for subsequent repair and/or replacement of the peripheral assembly. Further, any repair of the aircraft may be efficient and "modular" as components may be easily replaced, since the damage due to any collision may be considered minimal or at least controlled.

In various embodiments, the peripheral assembly includes a breakaway or release mechanism configured to releasably couple the peripheral assembly to a portion of the aircraft. For example, the breakaway or release mechanism may be configured to releasably couple a sensor probe to a wing assembly of the aircraft. The breakaway or release mechanism may be configured to separate the peripheral assembly and the portion of the aircraft upon the receipt of a threshold force. Broadly, the breakaway or quick release mechanism may include substantially any component or collection that permits a selectively releasable connection between the peripheral assembly (including the sensor probe) and the portion of the aircraft. For example, the breakaway or release mechanism may include a connecting feature configured to release the sensor probe from the portion of the aircraft upon the receipt of a predetermined threshold force.

The connecting feature may be sufficiently robust to maintain a structural connection between the sensor probe and the aircraft during standard flight operations. The connecting feature may further have one or more characteristics that allows the connecting feature to release the sensor probe from the wing assembly upon the predetermined threshold force, which may be a force greater than that experienced during standard flight operations, such as the force receipt upon impact of the sensor probe with another object, and/or may be a force at a predetermined angle. For example, in some instances, the forces that may be experienced by the sensor probe during impact with an object during flight may be within a particular angular range and the release mechanism may be configured to maintain a connection with the aircraft upon select angular ranges of force, but may breakaway or release in another set of angular forces, which may be less than those experienced at impact.

In one example, the connecting feature includes at least one flexible prong. The at least one flexible prong may extended from a mounting plate, blade, and/or other structure of the release assembly fixedly connected to the sensor probe. The at least one prong may extend away from such structure of the release assembly and into the portion of the aircraft, such as a portion of the wing assembly. The at least one prong may include a flexible portion and an overhang portion arranged at the end of the flexible portion. The overhang portion may be configured for receipt by a catch feature of the wing assembly. The flexible portion may be a reduced thickness portion of the at least one prong configured to bend or flex such that the overhang portion if released from the catch. The flexible portion may be configured to bend or deform sufficiently for release of the overhang portion upon receipt of the predetermined threshold force. In some cases, multiple prongs may be used, such as having two, three, four or more prongs. The multiple prongs may cooperate to define a multi-point releasable connection between the sensor probe and the portion of the aircraft.

In other examples, the connecting feature may include a sacrificial component that during standard operation of the aircraft facilitates a secure connection between the portion of the aircraft and the peripheral assembly. The sacrificial component may include one or more of a glass-filled nylon bolt, a shear pin, magnets, detents, and/or other features that are frangible or severable. Upon receipt of a threshold force, the sacrificial component is configured to fail in a predetermined manner. In the case of the glass-filled nylon bolt, the bolt may sever in response to the threshold force, causing the breakaway mechanism to detach or otherwise decouple the portion of the aircraft and peripheral assembly.

Upon failure of the sacrificial component, the breakaway may be configured to separate the peripheral assembly and the portion of the aircraft in a manner that allows the aircraft to continue operation in a safe and controlled manner. For example, the breakaway mechanism may be configured to move the peripheral assembly away from the aircraft, leaving other portions of the aircraft, e.g., the wing assembly, substantially intact. For example, the breakaway assembly may include angled surfaces that act to define a separation area and movement. In one example, the breakaway mechanism may include a base attached to a portion of the aircraft and a blade attached to the peripheral assembly. The base and the blade may define a breakaway interface therebetween with the sacrificial component extending therethrough for the releasable coupling of the base and the blade. The breakaway interface may include a sloped interface adjacent a leading edge of the blade that facilitates the impartation of the threshold force to the sacrificial component, for example, causing the sacrificial component to shear· or sever in a predetermined manner. The breakaway interface may further include an undercut interface adjacent a trailing edge of the blade that facilitates the rotation or pivot of the blade (and peripheral assembly) away from the base (and aircraft) upon the failure of the sacrificial component. The peripheral assembly may be released from the aircraft without substantially damaging other components of the aircraft.

Turning now to the figures, FIG. 1A depicts an isometric view of an aircraft 100. The aircraft 100 is shown as a fixed-wing UA V. The aircraft 100 may include a fuselage 102, a tail 103, a wing assembly 104, and a propulsion system 106. The propulsion system 106 includes a front propeller 106a and a rear propeller 106b. The UA V may generally be configured to hold a payload, such as a package, letter, household good, or the like. The UAV may be configured to release the payload upon reaching a desired destination or drop location, including release via parachute or other controlled means. The UA V may be self-piloted or otherwise substantially automatically controlled. Additionally or alternatively, the UA V may be controlled by a remote operator. While many configurations are possible, the UAV may operate at an elevation of several hundred feet, or even several thousand feet, above a grade elevation. It will be appreciated that the aircraft 100 may include other components and/or encompass other variations of aerial and more generally moving vehicles, including piloted aircraft and/or other types of UAVs, such as helicopter-type UAVs.

Figure 1B:
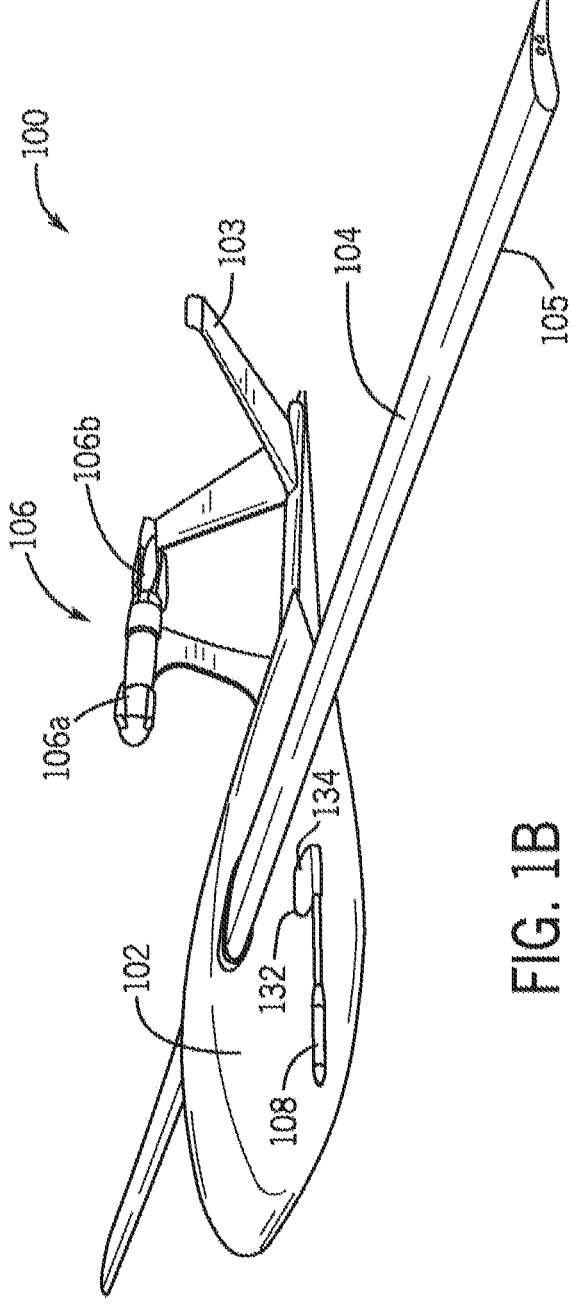
FIG. 1B depicts an isometric view of another example aircraft having one or more peripheral assemblies arranged in an alternative configuration.

The aircraft 100 may be equipped with an arrangement of peripheral assemblies, such as sensor probes. In the FIG. 1A example, the peripheral assemblies are sensor probes and the aircraft 100 includes eight sensor probes: a first sensor probe 108a, a second sensor probe 108b, a third sensor probe 108c, a fourth sensor probe 108d, a fifth sensor probe 108e, a sixth sensor probe 108f, a seventh sensor probe 108g, and an eighth sensor probe 108h. The sensor probes 108a-108h may be connected to a portion of the aircraft 100. In the example, of FIG. 1A, the sensor probes 108a-108h are connected to an underside 105 of the wing assembly 104. Additionally or alternatively, one or more of the sensor probes 108a-108h may be connected to the fuselage, as shown in FIG. 1B.

Figure 2:
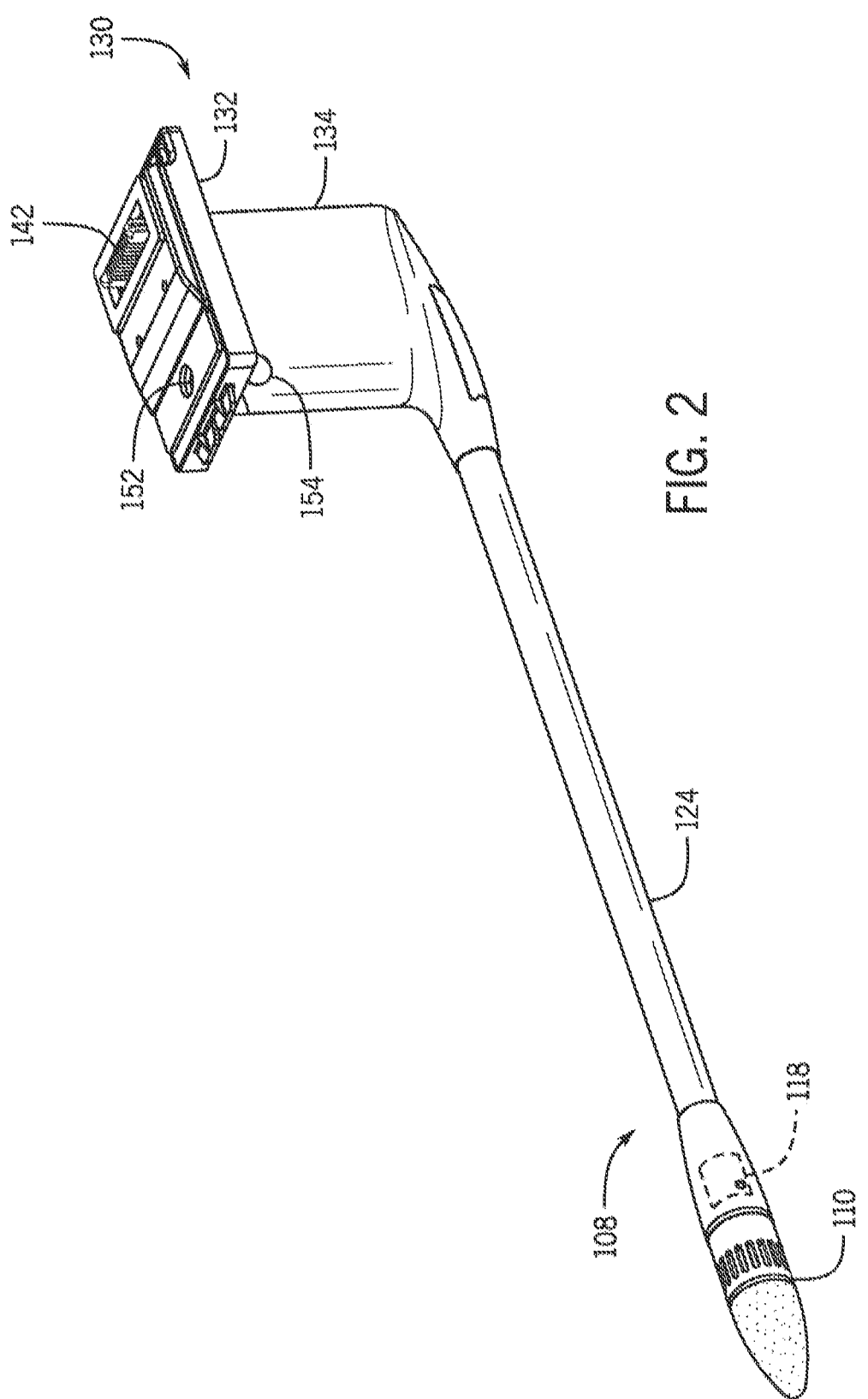
FIG. 2 depicts an isometric view of a sensor probe and breakaway or release mechanism.
Figure 3:
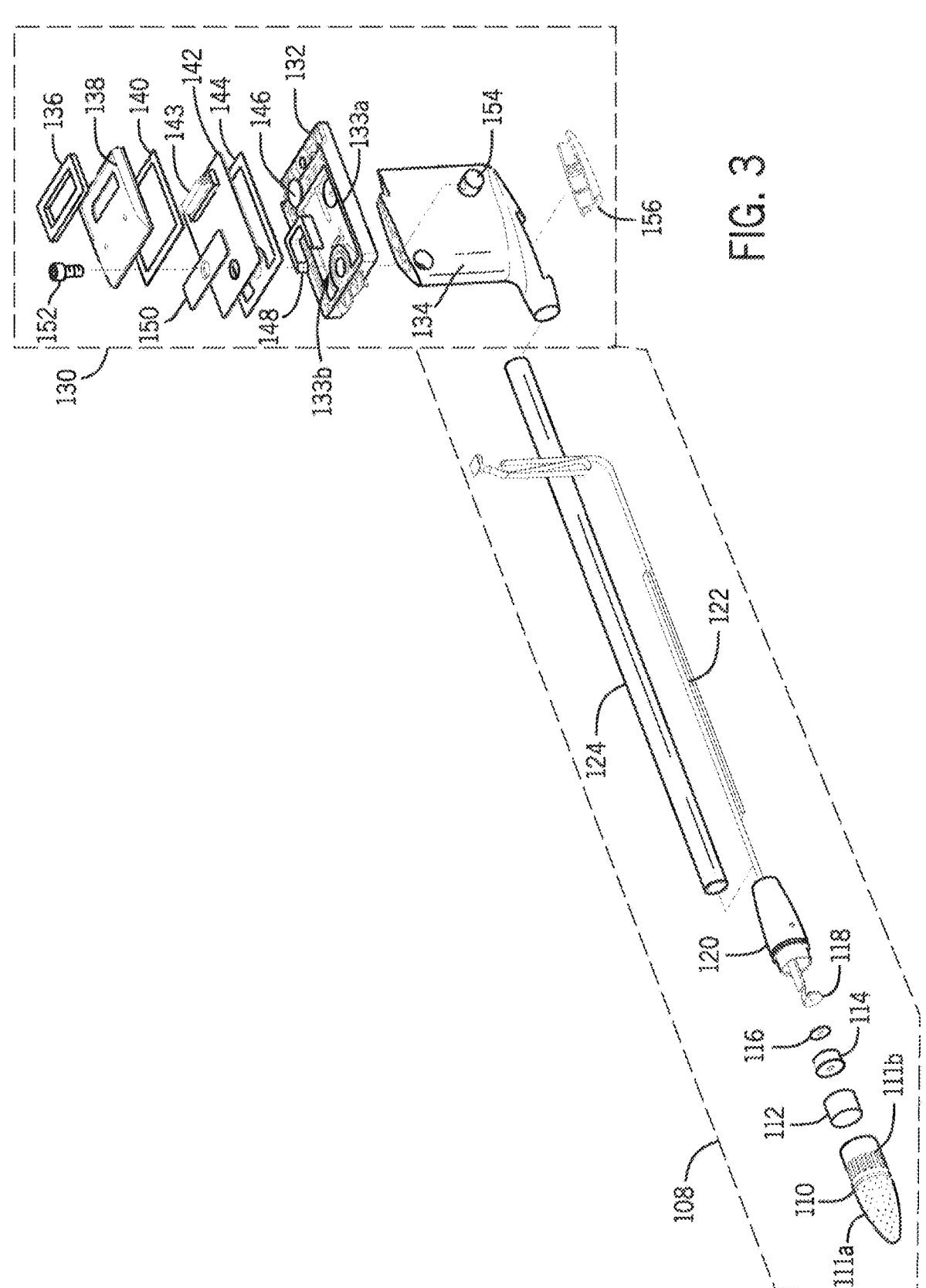
FIG. 3 depicts an exploded view of the sensor probe and breakaway mechanism of FIG. 2.

The sensor probes 108a-108h detect one or more signals that facilitate the operation of the aircraft 100, including audio signals. For purposes of illustration, FIGS. 2 and 3 depicts a sample implementation of the first sensor probe 108a. One such sensor probe is described in U.S. Patent Application No. 63/082,869 and U.S. patent application Ser. No. 17/138,526, entitled "ACOUSTIC PROBE ARRAY FOR AIRCRAFT," the entirety of the disclosure of which is incorporated by reference herein. The first sensor probe 108a may include a nosecone 110. The nosecone 110 may be associated with a microphone assembly 118 and be configured to shield a portion of the microphone assembly 118 from noise or other unwanted audio signals generated by direct impact of an airflow on the sensor probe 108a. In some cases, the nosecone 110 can be configured to shield the portion of the microphone assembly 118 for a plurality of local flow angles to facilitate the removal of the directional aspects of the airflow relative to the portion.

The nosecone 110 may also function as an environmental barrier between the microphone assembly 118 and the external environment, shielding the microphone assembly 118 from moisture, debris, radiation, and/or other contaminants. In some cases, a portion of the nosecone 110 may optionally include acoustically transparent materials, such as a porous, hydrophobic plastic material. The sensor probe 108a may include an optional intermediary media 112, a microphone assembly mount 114, an adhesive 116, and/or the microphone assembly 118. The optional intermediary media 112 may operate to filter incoming airflow, and/or selectively attenuate, or dampen a signal propagated through the nosecone material. The optional intermediary media 112 can include a foam, a tortuous path filter, precision woven fabric, and so on. The microphone assembly mount 114 may be fitted into the nosecone 110 and define a seat for the microphone assembly 118 with the adhesive seeming the microphone assembly 118 to the microphone assembly mount 114. The microphone assembly 118 is shown downstream of the nosecone 110 and orientated substantially perpendicular to a flow encountered by the nosecone 110; in other cases, other orientations are contemplated. The nosecone 110 may be connected to a nosecone mount 120. The nosecone mount 120 may be connected to an elongated tube 124. A flex harness 122 may extend through the tube 124 and electrically couple the microphone assembly 118 to electrical components of the aircraft 100. The sensors probes 108b-108h may be similarly constructed.

The peripheral assembly, such as the sensor probe 108a, may be releasably coupled with the wing assembly 104 or other portion of the aircraft 100 via a release or a breakaway mechanism 130. The breakaway mechanism 130 selectively releases the sensor probe 108a or other peripheral assembly from the wing assembly 104 or other portion of the aircraft while the wing assembly 104 remains substantially intact within the aircraft 100. In some cases, the aircraft 100 can be configured to continue operation after the selective release of the sensor probe 108a. For example, the aircraft 100 can continue flying and subsequently land in a controlled manner after the selective release of the sensor probe 108a. The breakaway mechanism 130 may include a base 132 and a blade 134 releasably connected to one another along a breakaway interface 180, as shown in FIG. 5B, via a sacrificial component.

Figures 4B, 5A, 5B:
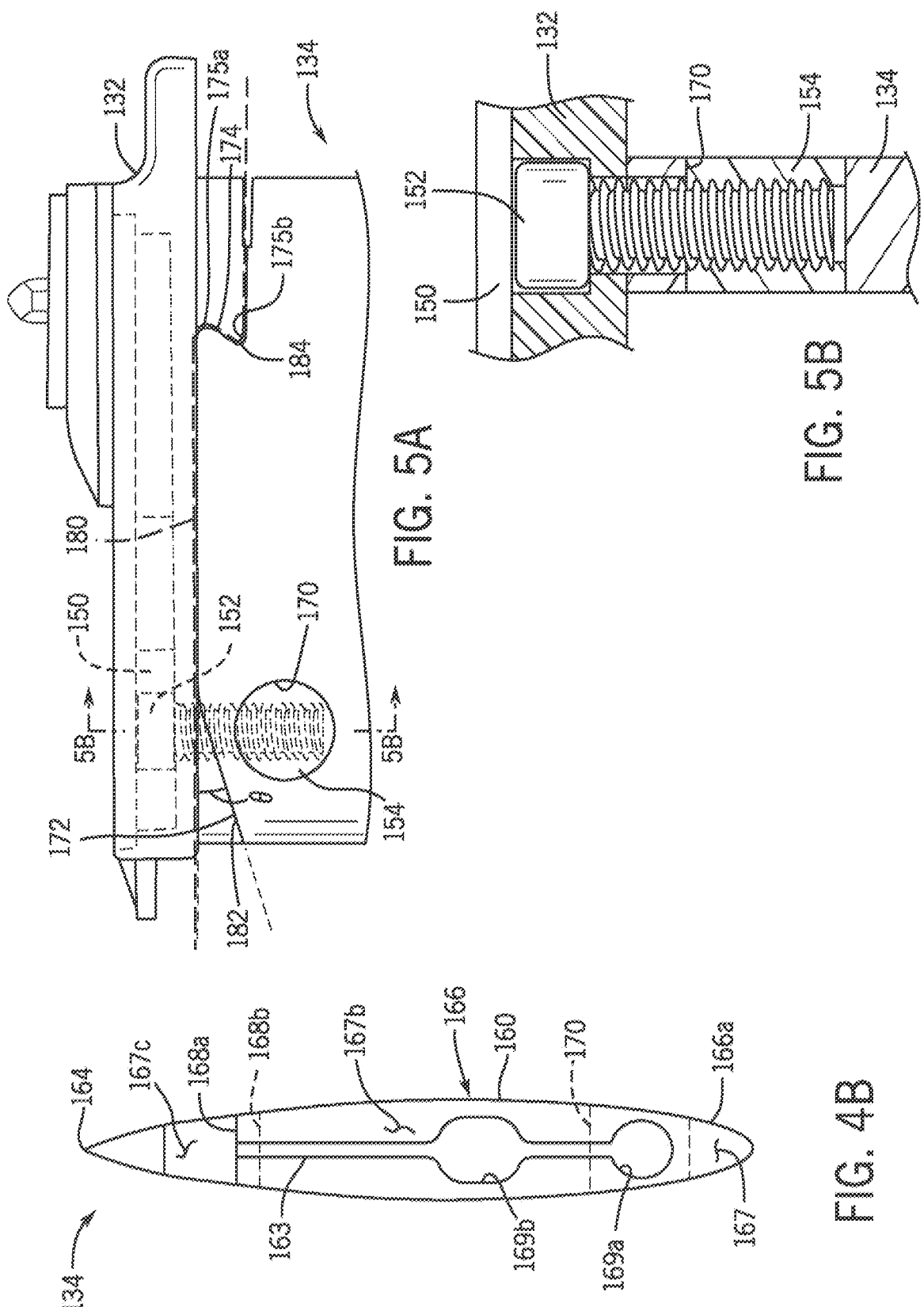
FIG. 4B depicts a top view of the blade of FIG. 4A.
FIG. 5A depicts a side view of a base and a blade of the breakaway mechanism of FIG. 3 that are engaged along a breakaway interface.
FIG. 5B depicts a cross-sectional view of the breakaway mechanism of FIG. 5A, taken along line 5B-5B of FIG. 5A.

With reference to FIGS. 3 and 5A, the base 132 may be defined by a shell 133a. The shell 133a may define an interior volume 133b. Along an exterior of the shell 133a and as shown with reference to FIG. 5A, the base 132 may include an engagement surface 171. The engagement surface 171 defines a base slope section 172 and a base pivot section 174. The base slope section 172 may be a substantially planar surface that extends along a slope angle θ relative to a horizontal plane of the breakaway mechanism 130. The slope angle θ may be less than 10 degrees, less than 20 degrees, less than 30 degrees, less than 45 degrees, or less than 60 degrees, as may be appropriate for a given application. The base pivot section 174 may include a base undercut 175a and a base protrusion 175b. The base undercut 175a may be a recessed portion of the engagement surface 171. The base protrusion 175b may be a protruding portion of the engagement surface 171 that extends from the base undercut 175a.

Figure 4A:
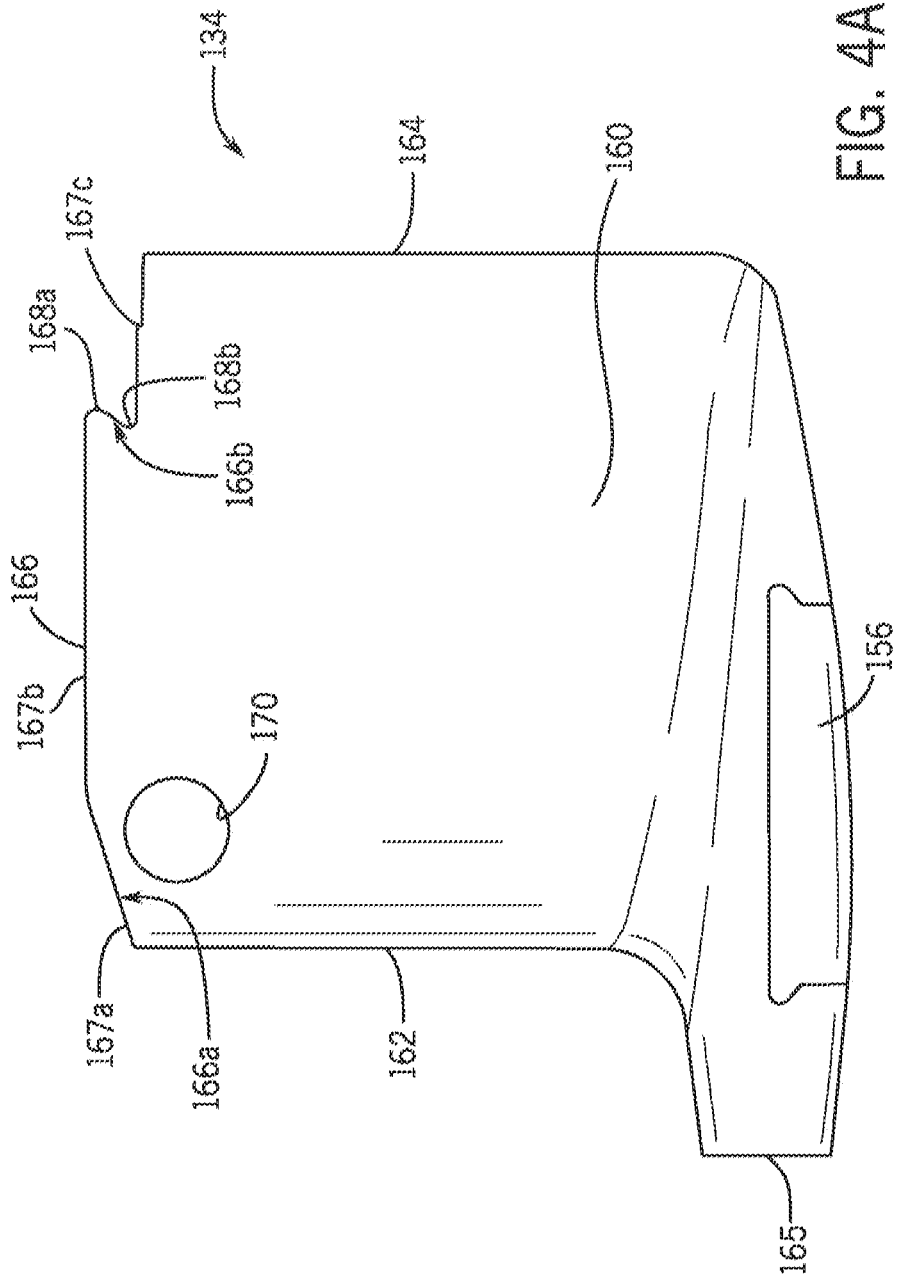
FIG. 4A depicts a side view of a blade of the breakaway mechanism of FIG. 3.

As illustrated in FIGS. 4A and 4B, the blade 134 may be an aerodynamic component having a body 160 that defines a blade leading edge 162 and a blade trailing edge 164. The body 160 may be contoured in order to encounter flow at the blade leading edge 162 and direct flow along a surface of the body 160 to the blade trailing edge 164 to minimize aerodynamic drag on the aircraft 100. Along or adjacent the bottommost edge of the blade 134, the body 160 may define a sensor probe connection 165. The tube 124, for example, may be adapted for mounting with the blade 134 at the sensor probe connection 165.

The body 160 of the blade 134 may also define a breakaway edge 166 along or adjacent a topmost portion of the blade 134. The breakaway edge 166 may be adapted to engage with the base 132 to define the breakaway interface 180. The breakaway edge 166 may include a blade sloped section 166a adjacent the blade leading edge 162. The blade sloped section 166a may define a blade sloped surface 167a at the breakaway edge 166 extending along the slope angle θ. For example, the blade sloped surface 167a may be sloped relative to a chord or other cross-dimension of the body 160 extending between the blade leading edge 162 and the blade trailing edge 164. Extending from the blade sloped section 166a at the breakaway edge 166 is a blade top surface 167b. The blade top surface 167b may include a generally planar surface that extends along a direction substantially parallel to the chord of the body 160. The breakaway edge 166 may also include a blade pivot section 166b adjacent the blade trailing edge 164. The blade pivot section 166b may include a blade protrusion 168a and a blade undercut 168b. The blade protrusion 168a may be a protruding portion of the breakaway edge 166 that extends from the blade top surface 167b. The blade undercut 175b may be a recessed portion of the breakaway edge 166 that extends from the blade protrusion 168a. A tail surface 167c may extend from the blade undercut 175b to the blade trailing edge 164. The tail surface 167c may be a stepped surface having two or more graduations between the blade undercut 175b and the blade trailing edge 164.

The breakaway edge 166 may define a connecting feature aperture 169a, an electrical coupling aperture 169b, and a channel 163. The connecting feature aperture 169a may extend into the body 160 of the blade at the blade sloped surface 167a. The electrical coupling aperture 169b may extend into the body 160 of the blade 134 at the blade top surface 167b. The channel 163 may extend into the body 160 of the blade 134 substantially along a centerline of the blade 134. In some cases, as shown in FIG. 4B, the channel 163 may extend between the connecting feature aperture 169a and the electrical coupling aperture 169b. In this regard, the channel 163, the connecting feature aperture 169a, and the electrical coupling aperture 169b may cooperate to collectively define a continuous opening along the breakaway edge 166.

The breakaway mechanism 130 may also include a coupling node 142. The coupling node 142 is an electrical component that establishes an electrical coupling between the sensor probe 108a and electrical components of the aircraft 100. The coupling node 142 may include electrical connectors 143 that include pins, conductors, or other features that may be used to establish an electrical connection. In some cases, the electrical connectors 143 may be used to electrically couple the flex harness 122 with the electrical components of the aircraft 100.

A gasket bracket 138 may be provided with the breakaway mechanism 130. The gasket bracket 138, as shown in FIG. 3. The gasket bracket 138 may define a protective plate or shield for internal components of the breakaway mechanism 130. The gasket bracket 138 may also include an opening therethrough to establish a passage for internal components of the breakaway mechanism 130 to extend through to couple with the aircraft 100. For example, the base 132 and the gasket bracket 138 may cooperate to substantially shield the coupling node 142 from an external environment, while allowing a portion of the coupling node 142, such as the electrical connectors 143, to extend through the gasket bracket 138 for operable coupling with the aircraft 100 (FIG. 2). A gasket 136 is also shown in FIG. 3. The gasket 136 may be formed from a flexible or compressive material. The gasket 136 may be positioned substantially around the electrical connectors 143 of the coupling node 142 in order to dampen vibration transmission between the aircraft 100 and the coupling node 142.

A vent 146, such as a gore vent, may also be provided with the base 132 to allow atmospheric ingress and egress while shielding the coupling node 142 from the external environment. In one example, the vent 146 can include a membrane fitted over through portions of the base 132. The membrane may be a breathable membrane that allows for the passage of air while blocking fluids and other debris. This can allow the atmospheric pressure of the breakaway mechanism 130 at the interior volume 133*b* to equalize with an external environment.

Figure 8A:
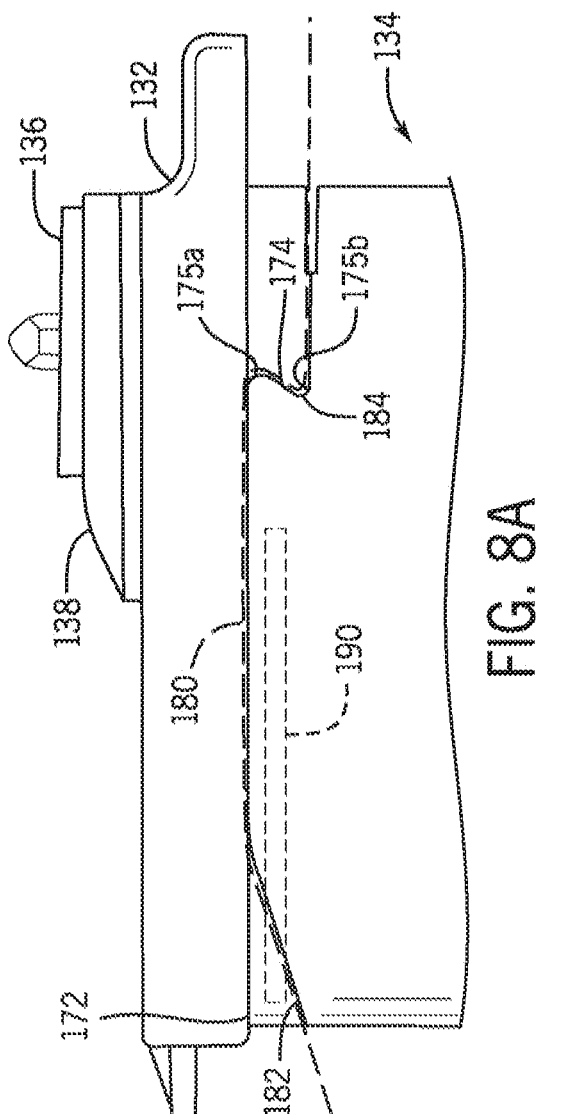
FIG. 8A depicts a side view of an example breakaway mechanism having a shear pin.

With continued reference to FIG. 3, a connecting feature 152 connects the blade 134 to the base 132. The connecting feature 152 is shown in FIG. 3 as a bolt, but in other variations may be other types of fasteners or connectors, such as, but not limited to, magnets, screws, shear· pins, detents, mechanical interlocking surfaces, and the like (see, e.g., FIGS. 8 and 9). The connecting feature 152 may define a sacrificial component for the breakaway assembly and be configured to fail at a predetermined force and/or force experienced at a particular angle or the like.

In some embodiments, the connecting feature 152 may include a nylon material, such as a glass-filled nylon material. The glass material may define a weaker portion of the connecting along the inside of the connecting feature 152, with the nylon material enclosing the glass material. The interior of the connecting feature 152 may be formed with the glass material to ensure that the connecting feature 152 may fail at a desired force. The quantity, dimensions, and other characteristics of the glass material may be tuned in order to induce failure of the connecting feature 152 at the desired force.

The breakaway mechanism 130 further includes a thread insert 154. The thread insert 154 may be a nut, catch, or other feature adapted to receive and secure a portion of the connecting feature 152 therein. For example, the thread insert 154 may include internal threads that are adapted for threadable engagement with threads of the connecting feature 152. A closeout 156 is positioned at and defines a bottommost edge of the blade 134. The closeout 156 may be defined by a substantially cylindrical surface that matches a contour of the tube 124. The closeout 156 may include two or more holes extending therethrough. The holes can be configured to define a channel for inserting a glue or other bonding substance into the breakaway mechanism 130. A mounting foam 150 mounting foam may define an interface between the connecting feature 152 and the coupling node 142. The connecting feature 152 may extend through the mounting foam 150, the coupling node 142, the adhesive 144, and the base 132.

The breakaway mechanism 130 may be coupled such that the base 132 and the blade 134 are engaged with one another and cooperating to define a breakaway interface 180. The breakaway interface 180 may include a sloped interface 182 adjacent the blade leading edge 162. The sloped interface 182 may be defined by an engagement or contact between the blade sloped section 166*a* and the corresponding base slope section 172. The sloped interface 182 may proceed or otherwise be orientated at the slope angle θ relative to a chord of the blade 134. The breakaway interface 180 may also include an undercut interface 184. The undercut interface 184 may be defined by an engagement or contact between the blade pivot section 166*b* and the corresponding base pivot section 174. For example, the base undercut 175*a* may be adapted to substantially receive the blade protrusion 168*a* in the engaged configuration of FIG. 5A. The blade undercut 168*b* may be adapted to substantially receive the base protrusion 175*b* in the engaged configuration.

The connecting feature aperture 169*a* may be adapted to receive the connecting feature 152 or other sacrificial component of the breakaway mechanism 130. The connecting feature aperture 169*a* may extend into the body 160 and meet with the thread insert aperture 170. The thread insert aperture 170 may be adapted to receive the thread insert 154 or other feature of the breakaway mechanism 130 adapted to catch and secure the connecting feature 152 within the blade 134. In this regard, the connecting feature 152 may extend through the connecting feature aperture 169*a* and into the thread insert aperture 170 for engagement, such as threadable engagement, with the thread insert 154 at the thread insert aperture 170.

The connecting feature 152 is adapted to extend through the breakaway interface 180, as shown in the cross-sectional view of FIG. SB. More specifically, the connecting feature 152 may extend through the sloped interface 182 of the breakaway interface 180. The base 132 and the blade 134 may cooperate to cause the connecting feature 152 to fail along the sloped interface 182. For example, the slope angle θ can be tuned in order to cause the connecting feature 152 to shear or sever along the sloped interface 182. The blade leading edge 162, in one example, may receive a threshold force and the arrangement of the sloped interface 182 may cause a component of the threshold force to be transfer to the connecting feature 153 for shearing along the interface 180.

Figures 6, 7:
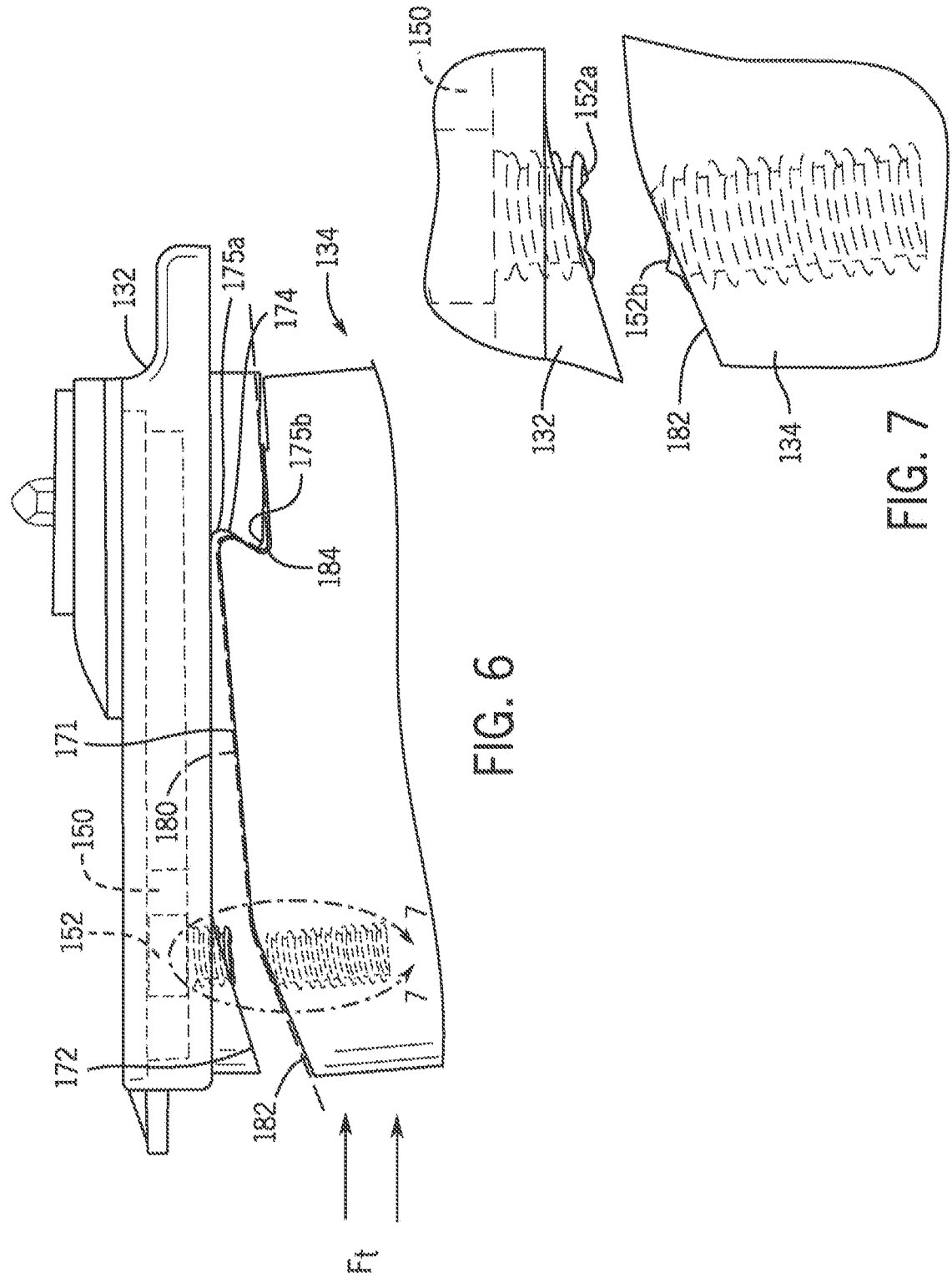
FIG. 6 depicts a side view of the base and the blade of FIG. 5A that are partially separated from one another.
FIG. 7 depicts detail 7-7 of FIG. 6.

For example and as shown in FIG. 6, the blade 134 may receive a threshold force Ft along the blade leading edge 162. The threshold force Ft may be indicative of a force associated with the collision of the blade 134 or other component with another object. The threshold force Ft may induce a separation of the blade 134 from the base 132. For example, the threshold force Ft may have a force component that pulls the blade 134 away from the base 132. With reference to FIGS. 6 and 7, a component of the threshold force Ft may be directed substantially along the sloped interface 182 and towards and through the connecting feature 152 extending therethrough. As described above, the connecting feature 152 may be configured to fail or sever upon receipt of the component of the threshold force Ft directed along the sloped interface 182. Accordingly, the connecting feature 152 is shown in FIGS. 6 and 7 as being sheared or severed in response to the threshold force Ft. Once severed, a first portion 152*a* of the connecting feature 152 may remain with the base 132 and a second portion 152*b* of the connecting feature 152 may remain with the blade 134.

The blade 134 and the base 132 are releasably connected to one another via the connecting feature 152. Once the connecting feature 152 is severed, the blade 134 and the base 132 are free to move relative to one another. With the base 132 remaining intact within the aircraft 100, the blade 134 may be induced to move away from the base 132 and separate from the aircraft 100. The undercut interface 184 facilitates a clean separation of the blade 134 from the base 132. For example, the undercut interface 184 may allow a bulk of the blade 134 and connecting sensor probe 108 to move away from the aircraft 100 without causing additional damage to the aircraft 100, e.g., without impacting other components or defining overly sharp, frayed, or jagged edges. As shown in the example of FIG. 6, the blade 134 can pivot or rotate about the base 132 at the undercut interface 184, allowing the blade 134 to effectively swing away from a direction of travel of the aircraft 100. In the present example, the blade undercut 168*b* may be adapted to receive the base protrusion 175*b*. The base protrusion 175*b* may establish a fulcrum about which the blade 134 temporarily pivots about to guide the blade leading edge 162 away from the base 132. The blade 134 may continue pivoting or more generally rotating about the base protrusion 175b until the blade 134 slides off the base protrusion 175b and away from the aircraft 100.

In addition or in the alternative to the glass-filled nylon bolt of the connecting feature 152, the connecting features and sacrificial components more generally may include or be associated with a variety of other components to facilitate the separation of the blade 134 and the base 132. In the example of FIG. SA, an optional shear pin 190 is shown in phantom. The shear pin 190 may extend through the breakaway interface 180 at the sloped interface 182 and connect the base 132 and the blade 134 to one another. Receipt of a threshold force at the blade 134 may induce a torsion force on the shear pin 190 that causes the shear pin 190 to sever substantially along the sloped interface 182. With the failure of the shear pin 190, the blade 134 and the base 132 may be free to move relative to one another, allowing the blade 134 to separate from the aircraft 100, as described above.

Figure 8B:
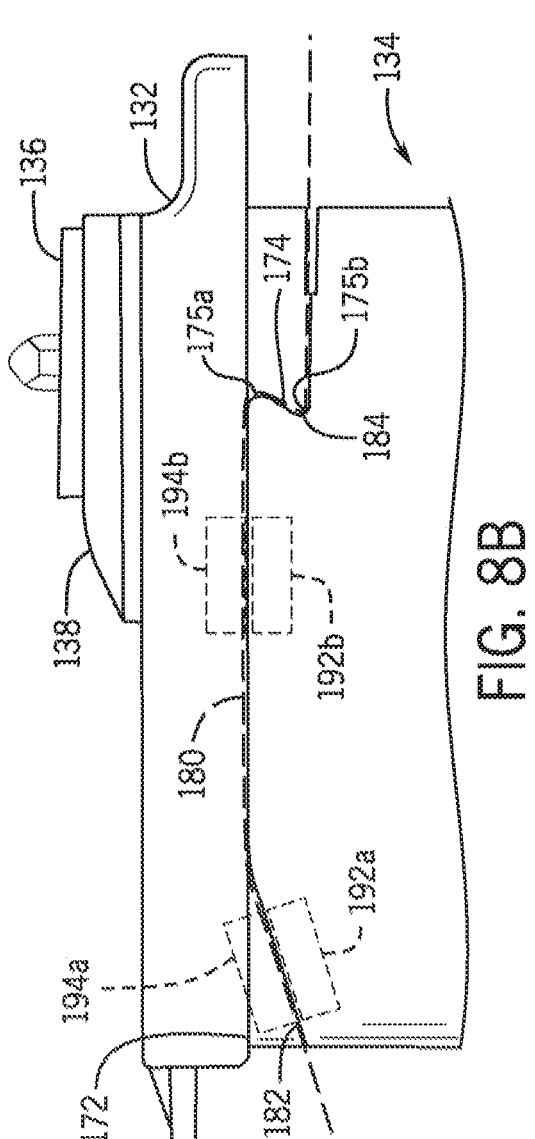
FIG. 8B depicts a side view of an example breakaway mechanism having magnets.

In the example of FIG. 8B, magnets are implemented in order to facilitate the releasable coupling of the base 132 and the blade 134. For the sake of illustration, a first base magnet 194a and a first blade magnet 192a are shown magnetically coupled to one another along the sloped interface 182. A second base magnet 194b and a second blade magnet 192b are shown magnetically coupled to one another at another portion of the breakaway interface 180. Receipt of a threshold force at the blade 134 may induce a force on the magnets that overcomes a magnetic forces holding the respective magnets together. In overcoming the magnetic force, the blade 134 and the base 132 may be free to move relative to one another, allowing the blade 134 to separate from the aircraft 100. In some cases, the magnets may be used on conjunction with detents, shear pins, bolts, and/or mechanical interlocks to secure the blade 134 and the base 132 to one another.

Additional breakaway or release mechanisms or assemblies and connecting features are contemplated herein. FIGS. 9-13B show another example of a connecting feature configured to release the sensor probe from a portion of an aircraft upon receipt of a threshold force. For example, the connecting feature may, in a first configuration, define a secure connection between the sensor probe and the portion of the aircraft such that the sensor probe remains connected to the aircraft during standard flight operations. In a second configuration, the connecting feature may bend or deform, upon receipt of a threshold force, such that the sensor probe is released from the aircraft. In some embodiments, the threshold force is a force experienced at a particular location and/or angle relative to the connection feature. For example, the connecting feature may be configured to release the sensor probe from the aircraft upon the threshold force being received at a particular angle relative to the sensor probe. For example, the threshold force may be received at an angle associated with a collision, such as an angle that is offset from a longitudinal direction of the sensor probe 908. Stated in another manner, the connecting feature may be configured to release the sensor probe from the aircraft for different values of a threshold force based, in part, on the direction of the threshold force. As an illustration, the connecting feature may be configured to release the sensor probe from the aircraft based on the threshold force have a first value when received along the longitudinal direction, and further, the connecting feature may be configured to release the sensor probe from the aircraft based on the threshold force having a second value, different from the first value, when received along another direction.

Figure 9:
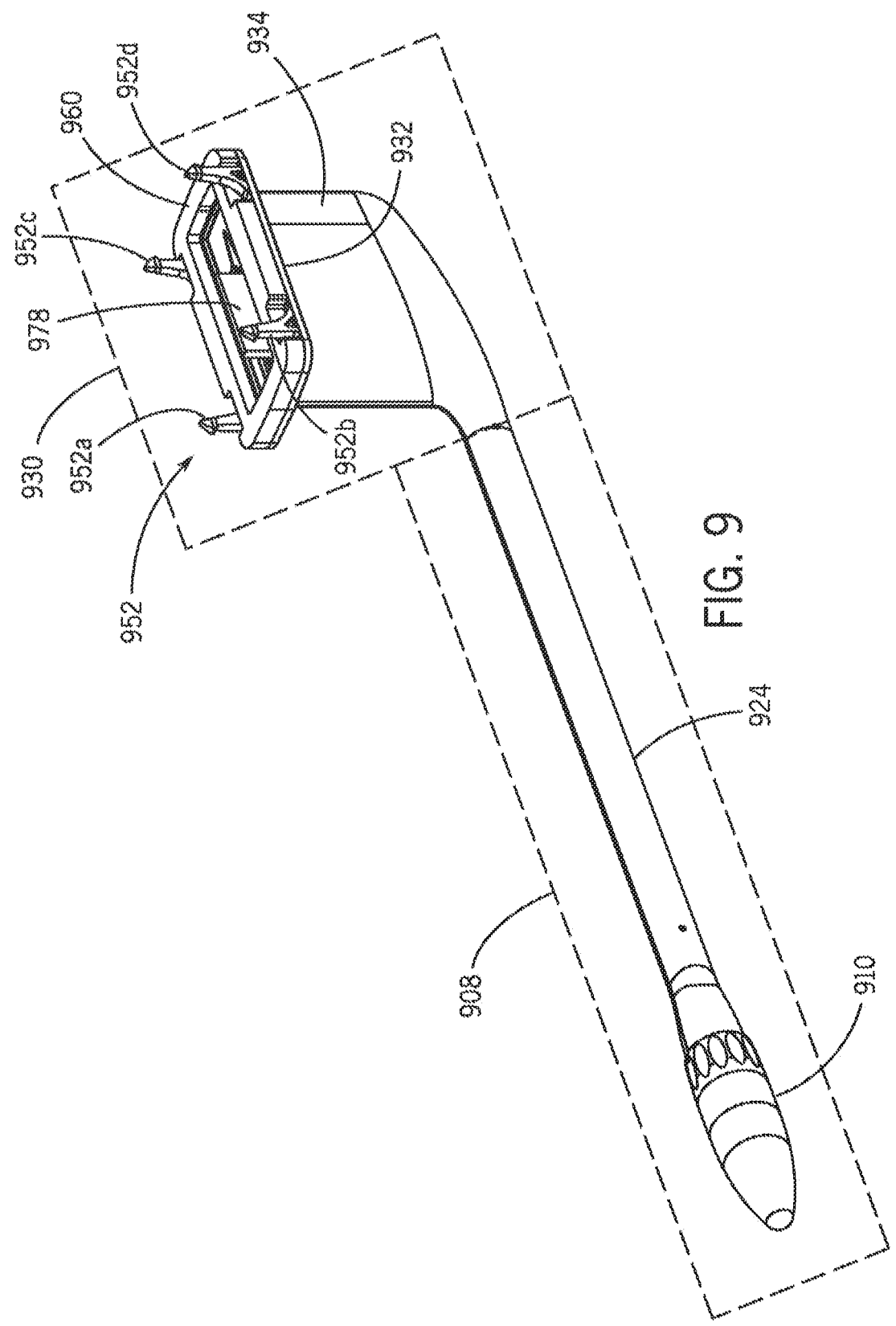
FIG. 9 depicts an isometric view of another example of a sensor probe and a release assembly.
Figure 10:
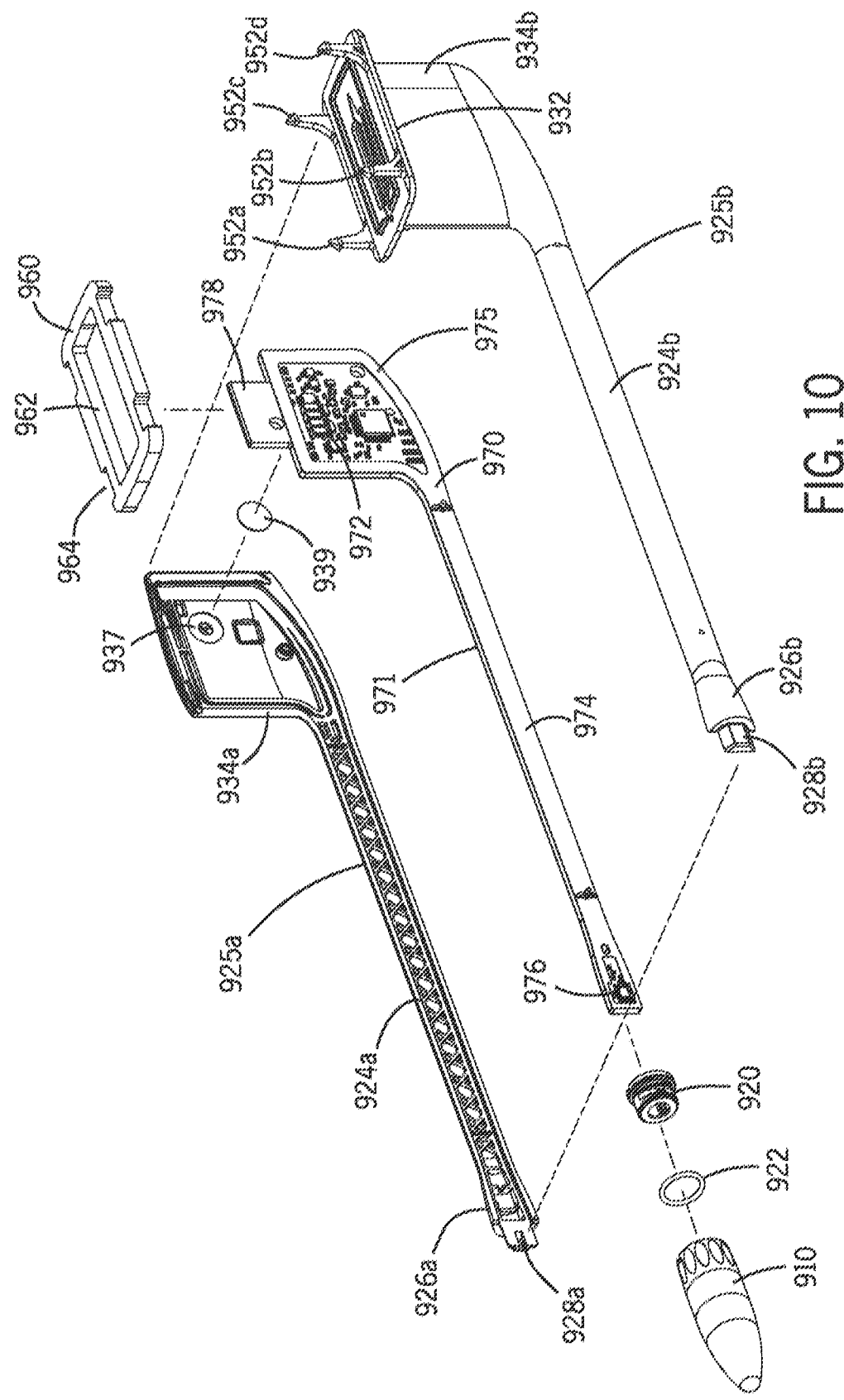
FIG. 10 depicts an exploded view of the sensor probe and the release assembly of FIG. 9.

With reference to FIGS. 9 and 10, a sensor probe 908 is shown. The sensor probe 908 may be substantially analogous to the sensor probe 108, as shown as described above in relation to FIGS. 2 and 3. As further shown in FIGS. 9 and 10, a release assembly 930 is provided. The release assembly 930 may be functionally similar to the breakaway mechanism 130 described above in relation to FIGS. 2 and 3. For example, the release assembly 930 may be configured to separate the sensor probe 908 (or peripheral assembly more broadly) from a portion of the aircraft, such as the wing. Further, the release assembly 930 may include a connecting feature 952. The connecting feature 952, similar to the function of the connecting feature 152, may be configured to releasably connect the sensor probe 908 to the portion of the aircraft. In the embodiment of FIGS. 9-13B, the connecting feature 952 may be a flexible component that flexes or deforms upon the receipt of a predetermined threshold force in order to release the sensor probe 908 from the portion of the aircraft.

Figures 11, 12:
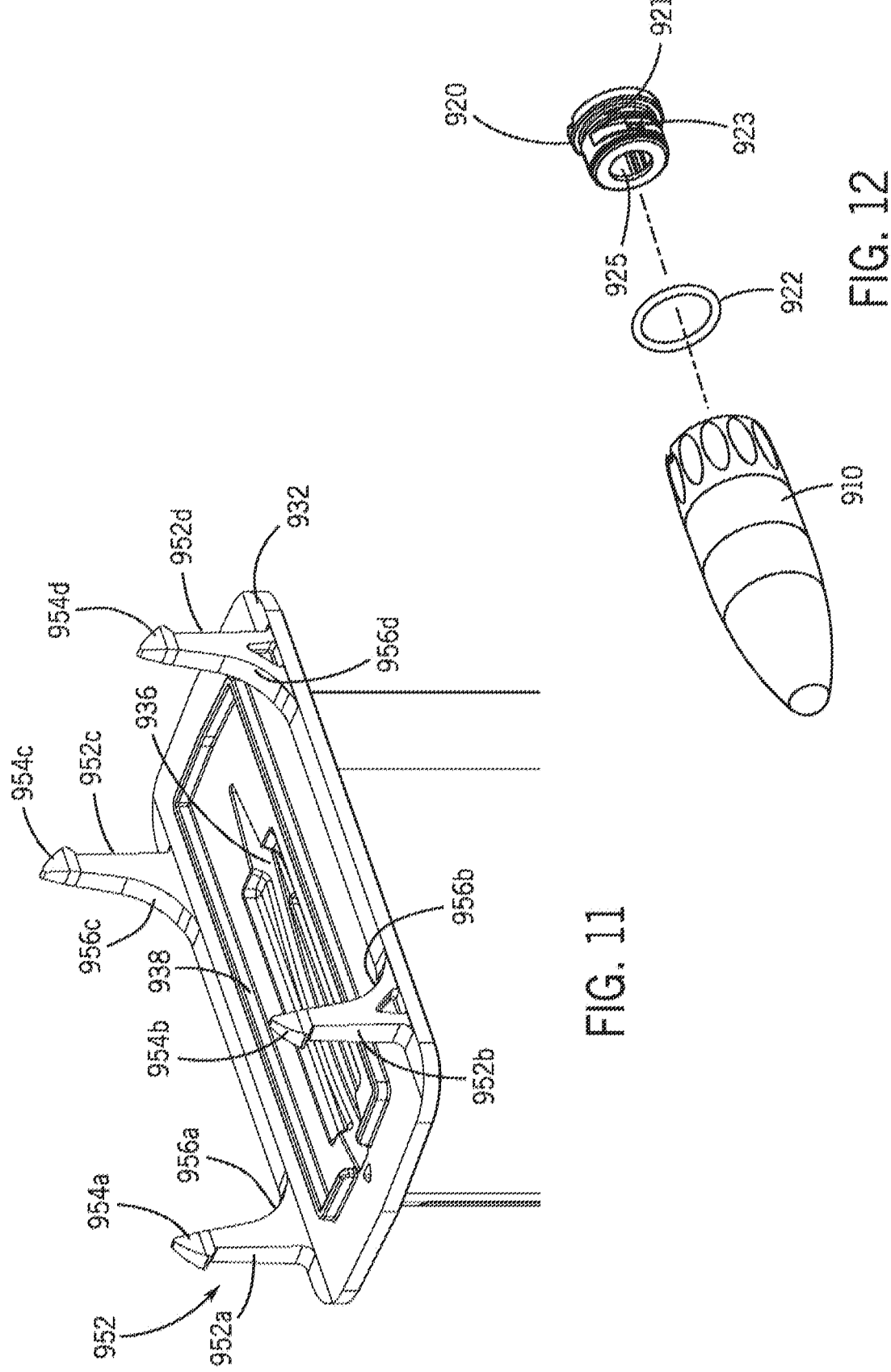
FIG. 11 depicts a detail view of a connecting feature of the release assembly of FIG. 10.
FIG. 12 depicts a detail view of the nosecone of the sensor probe of FIG. 10.

For example, and with reference to FIGS. 10 and 11, the connecting feature 952 may include at least one flexible prong. In the example of FIGS. 10 and 11, four flexible prongs are shown: a first flexible prong 952a, a second flexible prong 952b, a third flexible prong 952c, and a fourth flexible prong 952d. In other cases, more or fewer flexible prongs may be implemented. With reference to the first flexible prong 952a, the first flexible prong 952a may include an overhang portion 954a and a flexible portion 956a. The overhang portion 954a may include or define a free end of the first prong 952a receivable by a portion of the aircraft. The overhang portion 954a may be integrally connected with the flexible portion 956a and define an overhang or undercut therewith. For example, along at least one dimension, such as a width dimension, the flexible portion 956a may have a lesser value than the overhang portion 954a. This may allow the overhang portion 954a to be inserted into a catch or other feature of the portion of the aircraft and impede release of the first prong 952a therefrom. In some cases, the flexible portion 956a may have a reduced material thickness or content in order to permit flexing. In this regard, movement of the release assembly 930 may cause the flexible portion 956a to flex such that the overhang portion 956a moves, releasing the overhang portion 954a from the catch of the portion of the wing assembly upon the receipt of the predetermined force. It will be appreciated the second prong 952b may include an overhang portion 954b and a flexible portion 956b, the third prong 952c may include an overhang portion 954c and a flexible portion 956c, and the fourth prong 952d may include an overhang portion 954d and a flexible portion 956d; redundant explanation of which is omitted here for clarity.

The connection feature 952, including one or more of the flexible prongs 952a-952d, may be fixedly attached to the sensor probe 908 via the release assembly 930. In this regard, connection feature 952 may deform for release from the aircraft, permitting the release assembly 930 and the sensor probe 908 to separate from the aircraft as well. While many structures of the release assembly 930 are contemplated herein, FIGS. 9 and 10 show the release assembly 930 as including a blade portion 934 and a mounting plate portion 932. The blade portion 934 may be an aerodynamic component of that resembles the shape of a fin. The blade portion 934 may be configured to house electronic components and form a mechanical connection between the aircraft and the sensor probe 908, as described herein. The mounting plate portion 932 may be a structural component of the release assembly 930 that defines a support base for the connecting feature 952.

With reference to FIG. 11, the mounting portion plate 932 is shown rigidly connected to the blade portion 934 and generally arranged perpendicular therewith. The mounting portion plate 932 is shown in FIG. 11 as including an electronics passage 936 and a peripheral lip 938. The electronics passage 936 may be a through portion of the mounting plate 932 that extends into the blade portion 934, providing passage for electronic components and connections housed in the blade portion 934. The peripheral lip 938 may be a raised edge about the electronics passage 936. In some cases, the peripheral lip 938 may provide a barrier to external elements, including moisture and debris, from interacting with the electronic components. For example, the peripheral lip 938 may be configured to be seated on a complementary component of the aircraft and/or engaged with a dampener for substantially sealing the electronic components with the aircraft and reducing vibrations therewith. As further shown in FIG. 11, the flexible prongs 952a-952d are connected to, and extend from, the mounting plate portion 932. The respective flexible portions 956a-956d may protrude from the mounting plate portion 932 and allow the corresponding overhang portion 954a-954d to move or flex relative to the mounting plate portion 932. The prongs 952a-952d are arranged generally at corners of the mounting plate portion 932 in order to define a multi-point releasable connection between the sensor probe 908 and the portion of the aircraft. In other cases, other arrangement of prongs 952a-952d are contemplated herein.

The blade portion 934 may be constructed in a variety of manners, such as being an integrally formed component or a multi-piece assembly. In the example of FIGS. 9 and 10, the blade portion 934 may include a first blade portion 934a and a second blade portion 934b. The first and second blade portions 934a, 934b may each be considered blade portions halves that are connected to one another to define the blade portion 934. The first and second blade portions 934a, 934b may cooperate to form a cavity or opening therebetween. The first blade portion 934a may define a vent hole 937 therethrough. A gore vent or other barrier 939 may be arrangeable on the vent hole 937. The combination of the vent hole 937 and the barrier 939 may permit ingress and egress of air into the cavity defined by the first and second blade portions 934a, 934b (e.g., to facilitate pressure equalization), while blocking moisture and debris from entering. The second blade portion 934b may be rigidly connected to the mounting plate portion 934, as shown in FIG. 10. The first and second blade portion 934a, 934b may be fixedly connected to the sensor probe 908, as described below.

For example, the sensor probe 908 may include an elongated tube 924 and a nosecone 910. The elongated tube 924 and the nosecone 910 may be substantially analogous to the elongated tube 124 and the nosecone 110 described above in relation to FIGS. 2 and 3. Notwithstanding the foregoing, the elongated tube 924 is shown in the example of FIG. 10 as include a first elongated tube portion 924a and the second elongated tube portion 924b The first and second elongated tube portion 924a, 924b may be considered elongated tube halves that are connected to one another to define the elongated portion 924. The first and second elongated tube portion 924a, 924b may cooperate to define a tube cavity therebetween for passage of electronic components to the nosecone 910.

The elongated tube 926 and the blade 934 may be fixedly connected to one another. In some cases, the elongated tube

926 and the blade 934 may be separate components that are bonded to one another. In other cases, the elongated tube 926 and the blade 934 (or portions thereof) may be constructed as an integrally formed structure. For example, and as shown in FIG. 10, a first superstructure a first superstructure 925a is provided. The first superstructure 925a may be a single, integrally formed component that includes both the first blade portion 934a and the first elongated tube portion 924a. Further, a second superstructure 925b is provided. The second superstructure 925b may be a single, integrally formed component that includes both the second blade portion 934b and the second elongated tube portion 924b. In some cases, the second superstructure 925b may also include the mounting plate portion 932 and the connecting feature 952.

The elongated portion 924 is configured for coupling with the nosecone 910. As shown in FIGS. 10 and 12, the first superstructure 925a may include a first aerodynamic end 926a that terminates in a first seat 928a. Further, the second superstructure 925b may include a second aerodynamic end 926b that terminates in a second seat 928b. The first and second aerodynamic ends 926a, 926b may cooperate to transition an exterior dimension of the sensor probe 908 to the lesser width of the elongated portion 926 to the greater width of the nosecone 908. The first and second seats 928a, 928b may cooperate to define a mount or other feature to facilitate connection of the nosecone 910 to the elongate portion 926.

For example, the sensor probe 908 may include a nosecone mount 920 and a sealing ring 922. Broadly, the nosecone mount 920 may be seated on the first and second seats 928a, 928. In some cases, an adhesive, fastener, or other mechanism may be used to secure the nosecone mount 220 to the first and second seats 928a, 928b. With reference to FIG. 12, the nosecone mount 920 may include an annular rim 921, a locking groove 923, and a through portion 925. The annular rim 921 may be a circumferential groove or cut configured to receive a sealing element, such as the sealing element 922. The locking groove 923 may include threads, a stop, or other feature to facilitate retaining the nosecone 210 on the nosecone mount 920. The through portion 925 may be a through portion 925 of the nosecone mount 920 that extends fully through a longitudinal thickness of the nosecone mount 910 for the passage of electronic components, including wires, therethrough. The nosecone 910 may be coupleable with the nosecone mount 920 via snap fit connection. For example, the sealing element 922 may be seated on the annular rim 921. Next, the nosecone 910 may be advanced onto the nosecone mount 220 and engaged with the locking groove 923. In some cases, the nosecone 910 may be coupled with the locking groove 923 such that a quarter turn of the nosecone 910 relative to the nosecone mount 920 allows the nosecone to be separated from the nosecone mount 920. The through portion 921 may be aligned with the nosecone 910 such that sensors, including microphones, may be used to detect sound at the nosecone 910, as described herein, and transmit the signal for processing to other electronic components of the sensor probe 908 or aircraft more generally.

In one example, the sensor probe 908 includes a Printed Circuit Board Assembly or PCBA component 970. The PCBA component 970 may include a structural board 971. The structural board 971 may be a generally rigid component that extends from the release assembly 930 and to the sensor probe 908. In the illustrated example, the structural board 971 includes an board elongated portion 974, a board blade portion 975, a board end portion 973, and a board aircraft portion 978. The PCBA component 970 having the structural board 971 may generally be shaped to fit to match the shape of the sensor probe 908 and/or the release assembly 930 defined by the superstructures 925a, 925b such that the PCBA component is arrangeable fully within the superstructure 925a, 925b. For example, the board elongated portion 974 may match a shape of the elongated tube 926 and fit therein. The board blade portion 975 may match a shape of the blade portion 934 at fit therein. The board end portion 973 may match a shape of the first and second seats 928a, 928 and fit therebetween. The board aircraft portion 978 may protrude from the board blade portion 934 for electrical interconnection with complementary electronic components of the aircraft. The PCBA component 970 may also include various other functions, including, but not limited to, being a control board that supports various electrical components of the aircraft.

The PCBA component 970 may include one or more printed circuit boards and/or integrate circuit components. In the example of FIG. 10, the PCBA component 970 includes a microphone assembly component 976 at the board end portion 973. The PCBA component 970 may include a circuit board component 972 at the board blade portion 975. The board end portion 976 may be arranged such that the microphone assembly component 973 is positioned adjacent or partially within the through portion 925 of the nosecone mount 920. In this regard, the microphone assembly component 973 may be configured to detect acoustic signal received through the nosecone 910, such as where the interior of the nosecone 910 is in acoustic of fluidic communication with the through portion 925 and the nosecone 910 is constructed form an acoustically transparent material, as described herein. The PCBA component 970 may include define an electrical coupling between the microphone assembly component 973 and the circuit board component 972. The circuit board component 972 may include one or more processing units that process a signal obtained by the microphone assembly component 973. The circuit board assembly component 972 may be electrically coupleable with the aircraft via the board aircraft portion 978.

For example, and as shown in the assembled configuration of FIG. 9, the PCBA component 970 may be fitted inside the sensor probe 908 and the release assembly 930. In the assembled configuration, the board aircraft portion 978 may be advanced into the electronics passage 936 of the mounting plate portion 932. The board aircraft portion 978 may protrude slightly from the mounting plate portion 932 such that the board aircraft portion 978 is engageable with complementary electronics of an aircraft.

In order to support vibration isolation, a dampener 960 is provided. The dampener 960 may be configured to sit on the mounting plate portion 932. The dampener 960 may include a dampener opening 962. In the assembled configuration, the board aircraft portion may be arranged extending through the dampener opening 962. The dampener 960 may further include notches 964. The notches 964 may define indents in the dampener material that are configured to receive a respective one of the prongs 952a-952d.

Figures 13A, 13B:
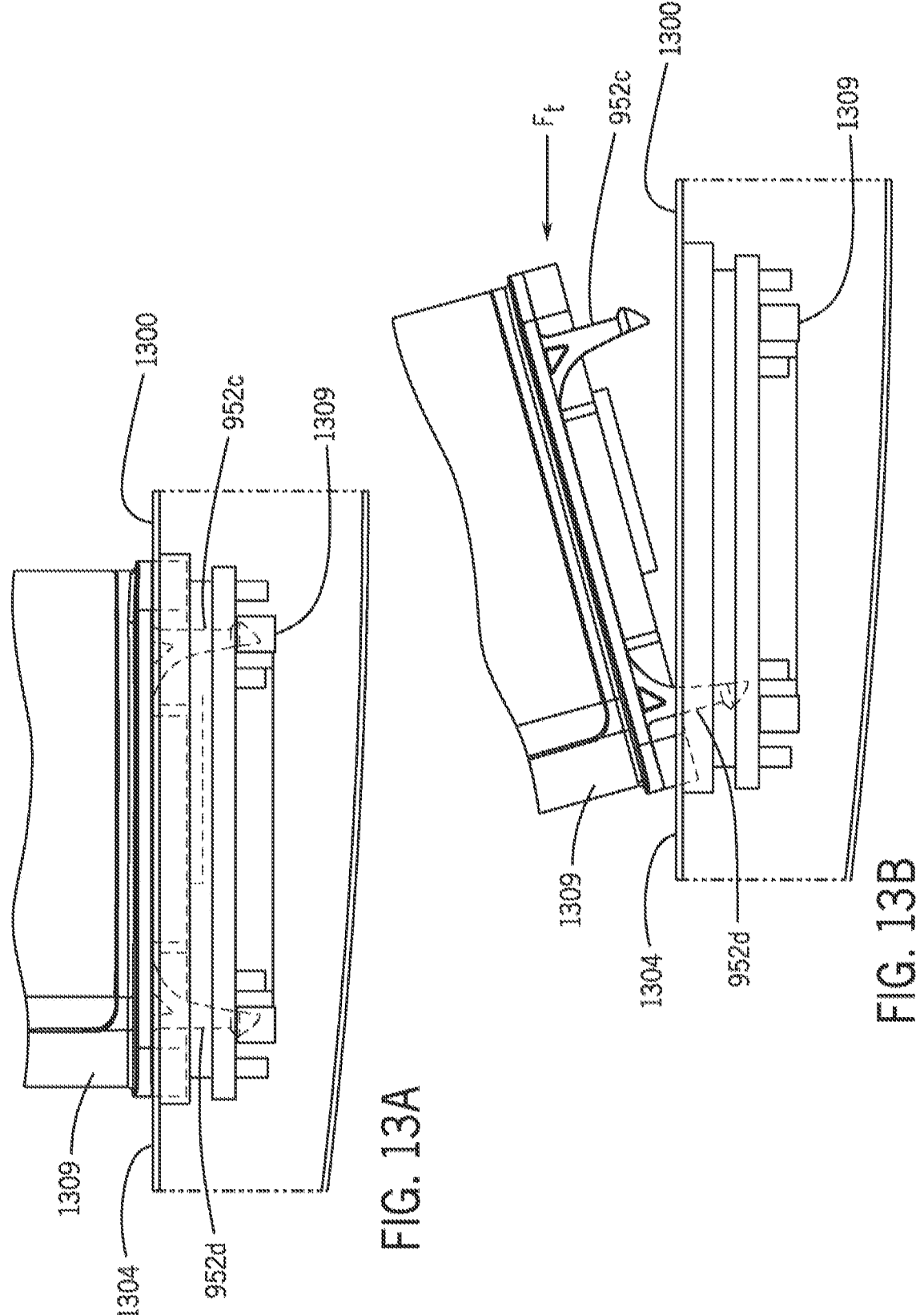
FIG. 13A depicts a side view of a portion of an aircraft and the release assembly of FIG. 10.
FIG. 13B depict a side view of the portion of the aircraft of FIG. 13A and the release assembly of FIG. 10 partially separated from the portion of the aircraft.

In operation, the release assembly 930 is releasably coupleable to a portion 1304 of an aircraft 1300, as shown in FIGS. 13A and 13B. The portion 1304 may be a wing assembly of the aircraft 1300, such as any of the wing assemblies described herein. The portion 1304 may include an opening 1306 that extends into a hollow body of the portion 1304. The portion 1304 may further include a catch 1308 arranged in the hollow body. The catch 1308 may include one or more catch seats 1309. The release assembly 930 may be releasably coupleable with the portion 1304 by advancing the prongs 952a-952d into the opening 1306. The prong 952a-952d may be advanced into the opening and seated in respective ones of the catch seats 1309. The catch seats 1309 may include a complementary geometry to the overhang features of the respective prongs 952a-952d. This may allow the overhang features to snap into place and define a snap fit with the catch seats 1309.

With reference to FIG. 13B, the release assembly 930 is shown partially separated from the portion 1304. For example, the release assembly 930 may receive a threshold force $F_t$. The threshold force $F_t$ may be a force that results from the sensor probe 908 striking an object, as one example. When the threshold force $F_t$ is a predetermined threshold force, the prongs 952a-952d may flex, as described herein. The flexing of the prongs 952a-952d may cause the connecting feature to be released from the catch 1308. For example, the flexing of the prongs 952a-95d may cause the respective ones of the overhang portions of the prongs to unseat from the catch seats 1309. Such flexing may, in turn, permit the release assembly to separate from the portion of the aircraft.

Figure 14:
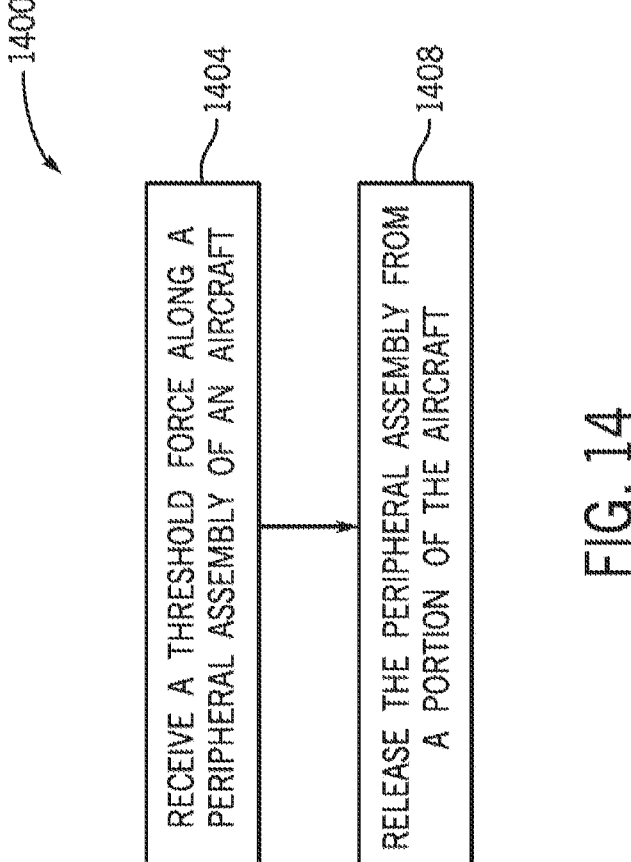
FIG. 14 depicts a flow diagram for releasing a peripheral assembly from an aircraft.

To facilitate the reader's understanding of the various functionalities of the embodiments discussed herein, reference is now made to the flow diagram in FIG. 14, which illustrates process 1400. While specific steps (and orders of steps) of the methods presented herein have been illustrated and will be discussed, other methods (including more, fewer, or different steps than those illustrated) consistent with the teachings presented herein are also envisioned and encompassed with the present disclosure.

At operation 1404, a threshold force is received along a peripheral assembly of an aircraft. For example and with reference to FIGS. 9 and 13B, the threshold force $F_t$ may be received along the sensor probe 908 and/or the release assembly 930. The blade 934 may direct a component of the threshold force Ft toward and through the connecting feature 952.

At operation 1408, the peripheral assembly is released from a portion of the aircraft. For example and with reference to FIGS. 9 and 13B, the connecting feature 952 may be adapted to secure the release assembly 930 to a wing assembly 1304 of an aircraft during standard operation. Upon receipt of the threshold force, the connecting feature 952 may deform, thereby permitting the separation of the release assembly 930. As one example, the connecting feature 952 may include the flexible prongs 952a-952d. During standard operation, the flexible prongs may be received by the wing assembly 1304 in order to secure the release assembly 930 to the wing assembly 1304. Upon receipt of the threshold force, the flexible prongs 952a-952d may flex or deform such that the prongs 952a-952d are releasable from the wing assembly 1304. This can contribute to a clean separation of the release assembly 930 form the wing assembly 1304, leaving the wing assembly 1304 substantially intact within the aircraft upon separation.

Figure 15:
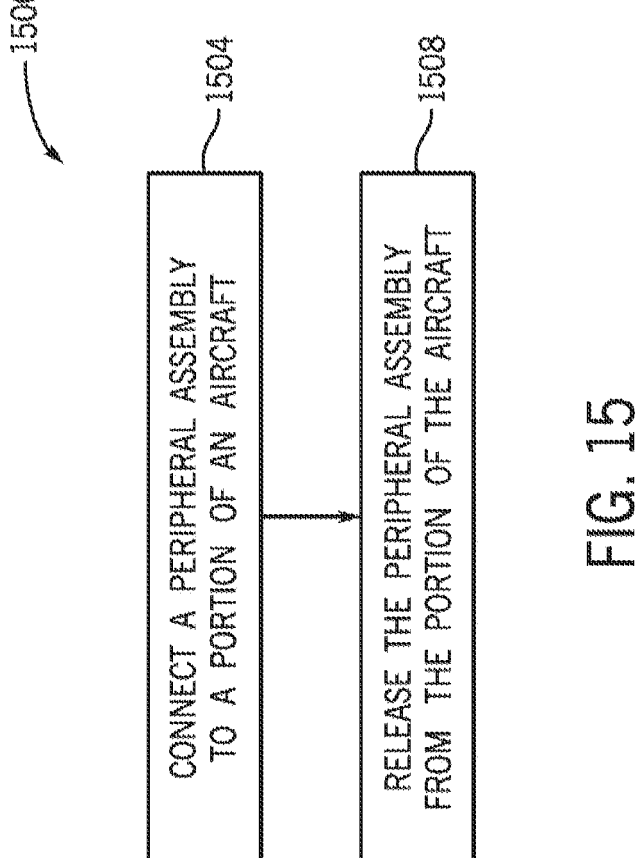
FIG. 15 depicts a flow diagram for installing a peripheral assembly on an aircraft.

With reference to FIG. 15, a method 1500 is disclosed for installing a sensor probe or peripheral assembly to a portion of an aircraft. At operation 1504, a peripheral assembly is connected to a portion of an aircraft. For example, and with reference to FIGS. 10 and 13A, a snap-fit connection may be defined between the connecting feature 952 and the catch 1308 of the portion 1304 of the aircraft 1300. To facilitate the foregoing, the prongs 952a-952d may be advanced into the opening 1306 and toward the catch 1308 to engage respective ones of the catch seats 1309. The prongs 952a-952d may flex or deform upon engagement with the respective one of the catch seats 1309. The overhang portions 954a-954d may snap or lock into place with a complementary feature of the catch seats 1309. Engagement in this manner may impede exit of the connecting feature 952 from the catch 1308. The operation 1504 may allow for quick and rapid installation of sensor probes with the aircraft 1300.

At operation 1508, the peripheral assembly is released from the portion of the aircraft. For example, and with reference to FIGS. 10 and 13B, the connecting feature 952, and associated prongs 952a-952d, may be flexed and deformed in order to permit release of the peripheral assembly. For example, a threshold force may be applied to the peripheral assembly that causes the connecting feature 952 to flex in a manner that unseats the prongs 952a-952d from the respective catch seats 1309. The operation of 1508 may allow the sensor probe to swapped out if damage occurs during flight. The operation 1508 may also allow for replacement probes and/or different or specialized probes to be installed with the aircraft 150 in an expedited manner.

Other examples and implementations are within the scope and spirit of the disclosure and appended claims. For example, features implementing functions may also be physically located at various positions, including being distributed such that portions of functions are implemented at different physical locations. Thus, the foregoing descriptions of the specific examples described herein are presented for purposes of illustration and description. They are not targeted to be exhaustive or to limit the examples to the precise forms disclosed. It will be apparent to one of ordinary skill in the art that many modifications and variations are possible in view of the above teachings.

What is claimed is:

1. An aircraft comprising:
   a portion of the aircraft having a wing assembly and
   a peripheral assembly comprising:
     a sensor probe; and
     a breakaway mechanism connecting the peripheral assembly to the portion of the aircraft having the wing assembly wherein the breakaway mechanism separates from the peripheral assembly and the portion of the aircraft upon receipt of a threshold impact force, the breakaway mechanism comprising:
       a connecting feature that facilitates a secure connection between the portion of the aircraft and the peripheral assembly;
       wherein the connecting feature is a sacrificial component that is configured to fail in a predetermined manner upon the breakaway mechanism receiving the threshold impact force, permitting separation of the peripheral assembly from the portion of the aircraft.

2. The aircraft of claim 1, wherein the sensor probe comprises:
   a microphone assembly having a portion configured to receive audio signals; and
   a nosecone configured to shield the portion of the microphone assembly from noise generated by direct impact of airflow.

3. The aircraft of claim 1, wherein the connecting feature is configured to release from the wing assembly upon receipt of the threshold impact force along a longitudinal direction of the sensor probe and transverse to the connecting feature.

4. The aircraft of claim 1, wherein the connecting feature comprises a nylon material, a glass material, a shear pin, magnets, or detents.

5. The aircraft of claim 1, wherein the breakaway mechanism further comprises:

a blade attached to the sensor probe; and
   a base attached to the portion of the aircraft;
   wherein the base and the blade are releasably connected to one another via the sacrificial component.

6. The aircraft of claim 1, wherein the breakaway mechanism further comprises:
   a coupling node that establishes an electrical coupling between the sensor probe and electrical components of the aircraft.

7. The aircraft of claim 1, wherein the breakaway mechanism further comprises:
   a thread insert configured for threadable engagement with threads of the connecting feature.

8. The aircraft of claim 1, wherein the sacrificial component is configured to fail in the predetermined manner by shearing or severing in a predetermined manner.

9. A method comprising:
   securing a connection between a portion of an aircraft having a wing assembly and a peripheral assembly with a breakaway mechanism, the breakaway mechanism comprising:
     a connecting feature that is configured to secure the connection between the portion of the aircraft and the peripheral assembly, wherein the connecting feature is a sacrificial component that is configured to fail in a predetermined manner upon the breakaway mechanism receiving a threshold impact force, permitting separation of the peripheral assembly from the portion of the aircraft;
   releasing the peripheral assembly from the wing assembly via the sacrificial component failing in the predetermined manner via receiving the threshold impact force;
   wherein the portion remains substantially intact during the releasing of the peripheral assembly.

10. The method of claim 9, wherein the peripheral assembly comprises a sensor probe, the sensor probe comprising:
   a microphone assembly having a portion configured to receive audio signals; and
   a nosecone configured to shield the portion of the microphone assembly from noise generated by direct impact of airflow.

11. The method of claim 10, wherein the threshold impact force is along a longitudinal direction of the sensor probe and transverse to the connecting feature.

12. The method of claim 10, wherein the connecting feature comprises a nylon material, a glass material, a shear pin, magnets, or detents.

13. The method of claim 10, wherein the breakaway mechanism further comprises:
   a blade attached to the sensor probe; and
   a base attached to the portion of the aircraft;
   wherein the base and the blade are releasably connected to one another via the sacrificial component.

14. The method of claim 13, wherein the received threshold impact force is associated with a collision of the blade with another object.

15. The method of claim 10, wherein the breakaway mechanism further comprises:
   a coupling node that establishes an electrical coupling between the sensor probe and electrical components of the aircraft.

16. The method of claim 9, wherein the breakaway mechanism further comprises:
   a thread insert configured for threadable engagement with threads of the connecting feature.

17. The method of claim 9, wherein the sacrificial component fails in the predetermined manner by shearing or severing in a predetermined manner.

18. The method of claim 9, wherein following the step of releasing the peripheral assembly, the method further comprises a step of:

landing the aircraft in a controlled manner.

\* \* \* \* \*